US012792946B2

(12) United States Patent
Fong et al.

(10) Patent No.: US 12,792,946 B2
(45) Date of Patent: Nov. 10, 2026

(54) SUBCIRCUIT INTELLIGENT ORCHESTRATION WITH MULTIPLE CRITERIA

(71) Applicant: Dell Products L.P., Round Rock, TX (US)

(72) Inventors: Victor Fong, Medford, MA (US); Brendan Burns Healy, Haddonfield, NJ (US); Benjamin E. Santaus, Somerville, MA (US); Miguel Paredes Quiñones, Campinas (BR); Rômulo Teixeira de Abreu Pinho, Niterói (BR)

(73) Assignee: Dell Products L.P., Round Rock, TX (US)

(*) Notice: Subject to any disclaimer, the term of this patent is extended or adjusted under 35 U.S.C. 154(b) by 657 days.

(21) Appl. No.: 18/345,125

(22) Filed: Jun. 30, 2023

(65) Prior Publication Data

US 2025/0148333 A1 May 8, 2025

Related U.S. Application Data

(60) Provisional application No. 63/383,304, filed on Nov. 11, 2022.

(51) Int. Cl.
*G06N 10/40* (2022.01)
*G06N 10/20* (2022.01)

(52) U.S. Cl.
CPC ............ *G06N 10/40* (2022.01); *G06N 10/20* (2022.01)

(58) Field of Classification Search
None
See application file for complete search history.

(56) References Cited

U.S. PATENT DOCUMENTS

2021/0406151 A1* 12/2021 Durazzo ................ G06N 10/80
2022/0391571 A1* 12/2022 Dhand ................... G06N 10/20

* cited by examiner

*Primary Examiner* — Eric C Wai
(74) *Attorney, Agent, or Firm* — Workman Nydegger

(57) ABSTRACT

Dynamic orchestration of quantum circuit execution. A runtime prediction is performed on a quantum circuit to determine or estimate an amount of resources and execution time that are needed to execute the quantum circuit. The runtime prediction may also estimate the resources, time, and other factors associated with cutting the quantum circuit. When cutting the circuit is beneficial, the quantum subcircuits generated by cutting the quantum circuit are subject to runtime prediction. This information generated by the runtime prediction, along with telemetry data from computing and quantum resources and service level objectives, is used to generate an execution plan for performing or executing the quantum circuit or the quantum subcircuits when the quantum circuit is cut.

17 Claims, 4 Drawing Sheets

SUBCIRCUIT INTELLIGENT ORCHESTRATION WITH MULTIPLE CRITERIA

FIELD OF THE INVENTION

Embodiments of the present invention generally relate to quantum computing systems and to orchestrating the execution of quantum workloads. More particularly, at least some embodiments of the invention relate to systems, hardware, software, computer-readable media, and methods for orchestrating quantum workloads, which includes orchestrating the execution of quantum circuits and/or quantum subcircuits.

BACKGROUND

Executing quantum circuits in quantum computing systems can be both complicated and time consuming for a variety of different reasons. For example, the quantum circuit may be too large for available quantum hardware. Further, even if the necessary quantum hardware exists, the quantum circuit may need to wait until the resources are free.

More specifically, se several difficulties exist with regard to quantum computing. When using real quantum hardware, the number of qubits is often limiting and, from a practical perspective, cannot execute quantum circuits with more qubits. Further, larger quantum hardware (comparatively more qubits) may be less accurate compared to quantum hardware with fewer qubits.

There are also problems associated with simulated quantum systems. As the complexity of a quantum circuit increases (e.g., more qubits required), the amount of resources required in the simulated quantum system increases exponentially. These issues complicate the ability to effectively and efficiently use quantum computing systems, whether real or simulated.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
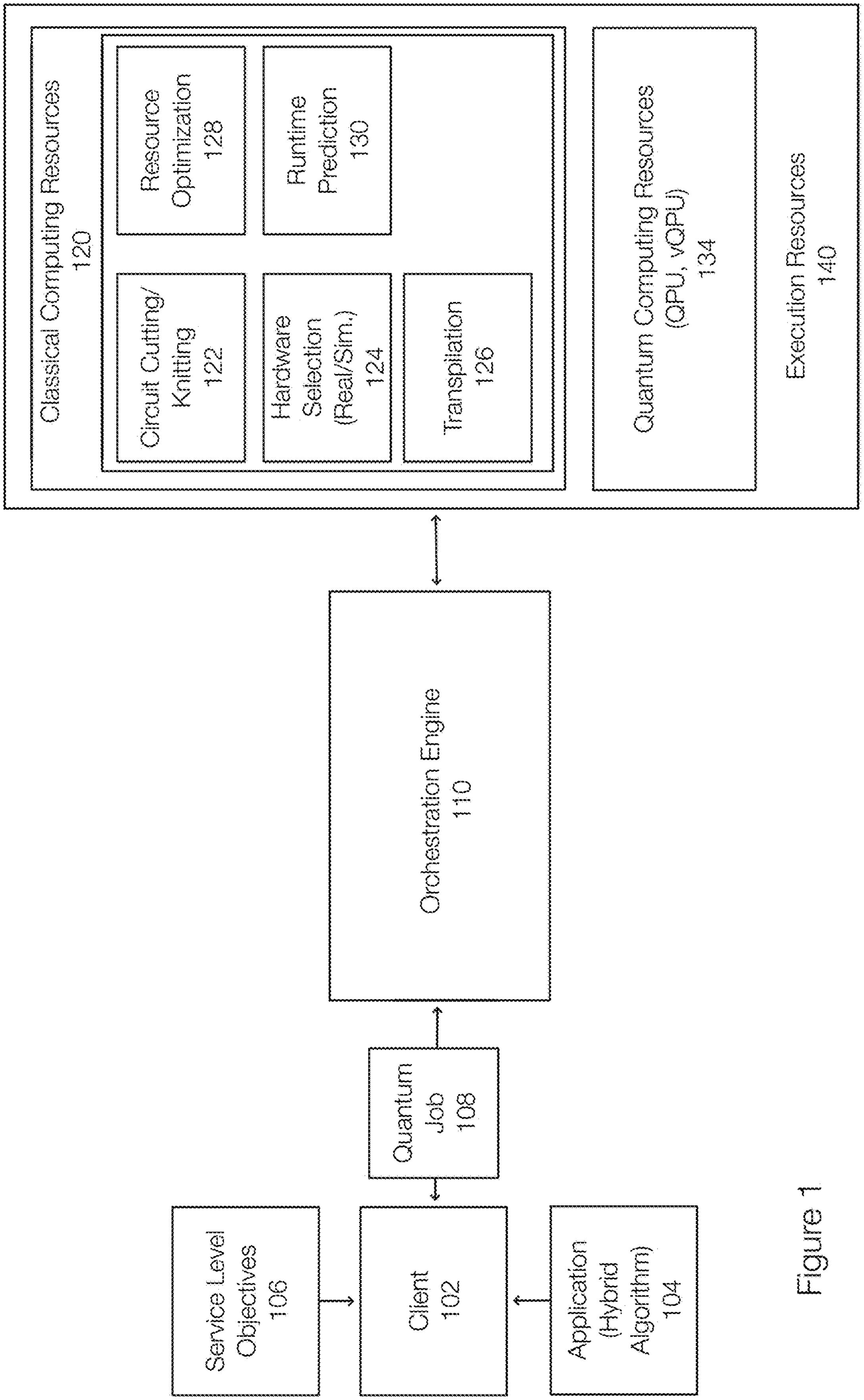
FIG. 1 discloses aspects of orchestrating the execution of quantum jobs and of executing quantum jobs.

Embodiments of the present invention generally relate to real and/or simulated quantum computing systems and the operations performed when executing quantum workloads. More particularly, at least some embodiments of the invention relate to systems, hardware, software, computer-readable media, and methods for orchestrating quantum jobs (i.e., quantum workloads) that may include quantum circuit(s). Quantum jobs may be executed in simulated quantum systems (e.g., virtual quantum systems or units (vQPUs) that include classical computing components (e.g., processors, memory) or real quantum hardware systems or units (QPUs).

More specifically, the execution of quantum jobs often requires both classical computing systems and quantum computing systems because several operations are performed during the execution of quantum jobs. Some of the operations are performed in classical computing systems and some of the operations are performed in quantum computing systems, whether real or simulated. Embodiments of the invention relate to orchestrating the operations performed in classical computing systems and in quantum computing systems.

In one example, a quantum job, which includes a quantum circuit, may be received at an orchestration engine that is configured to orchestrate the execution of the quantum job. Orchestrating the execution of the quantum circuit includes performing actions or tasks such as, but not limited to, transpilation operations, cutting operations, and knitting operations. These operations are orchestrated as necessary by an orchestration engine.

Transpilation is the process of converting the quantum circuit received by the orchestration engine into a circuit that matches the topology of a target quantum system. Circuit cutting is the process of dividing a quantum circuit into quantum subcircuits. Circuit cutting provides several benefits. As previously stated, the amount of classical computing resources required to simulate a quantum system increases exponentially as the size of the quantum circuit increases. Because the quantum subcircuits are smaller, the amount of required resources is decreased. Knitting operations include reconstructing the outputs or results of executing the quantum subcircuits in quantum computing systems in order to determine the output of the original quantum circuit. Knitting operations, which are performed in classical computing systems, are also resource intensive.

When orchestrating the execution of quantum circuits, attempts to optimize some of these quantum related operations (e.g., transpilation, cutting, knitting) may generate conflicts. For example, knitting operations become complex and resource intensive as the number of circuits to be knit together increases. As a consequence, the general goal of optimizing knitting operations is to reduce the number of quantum subcircuits to be knitted together. In contrast, increasing the number of quantum subcircuits is beneficial for cutting operations because smaller subcircuits consume fewer resources.

Embodiments of the invention thus relate to intelligently orchestrating operations such as cutting operations, knitting operations, transpilation operations, and/or execution operations. Embodiments of the invention further relate to intelligently orchestrating the execution of quantum subcircuits dynamically using multiple criteria.

Embodiments of the invention more specifically relate to orchestrating the execution of a quantum circuit with respect to cutting operations. When executing a quantum job, the orchestration engine may have the option of orchestrating the quantum circuit with or without cutting the quantum circuit.

When cutting is performed, the original quantum circuit is divided or cut into smaller quantum circuits (quantum subcircuits). After the cutting operation is performed, the orchestration engine orchestrates the execution of multiple quantum subcircuits, each with its own runtime characteristics. Similarly, the original quantum circuit may also have runtime characteristics. A machine learning model may be trained or configured to predict or estimate the runtime characteristics of an input quantum circuit.

Embodiments of the invention relate to orchestrating a quantum job that accounts for the runtime characteristics and/or other factors. By obtaining the runtime characteristics of a quantum circuit or of multiple quantum circuits, embodiments of the invention use these runtime characteristics to generate an execution plan to cut, transpile, execute, and/or knit the quantum circuit(s). In addition to runtime characteristics, embodiments of the invention may also account for service-level objectives that may be associated with a quantum job.

The runtime characteristics, in one embodiment, reflect the predicted or estimated resource consumption (resources required to perform the operation) and/or execution time. For example, the runtime prediction model may predict or estimate the resources and time required to execute a quantum circuit in a simulated quantum computing system. When generating an execution plan, embodiments of the invention may further consider the resources and execution time needed for aspects of performing quantum jobs such as circuit cutting in order to meet overall service-level objectives.

In one example embodiment, circuit cutting may be activated/deactivated as a feature of orchestrating a quantum job. In one embodiment, the orchestrator may perform circuit cutting operations (and/or other quantum related operations) in an automated and/or transparent manner based on various criteria such as, by way of example, when there are not enough resources to execute the quantum circuit within the boundary set by service-level objectives, and/or the circuit cutting can improve performance of overall system or service-level objectives.

In order to evaluate a quantum circuit in light of these example criteria, the orchestration engine may obtain telemetry data from each execution environment (e.g., each classical system and/or each simulated quantum system available for performing aspects or portions of the quantum job), across on-premise and cloud, as well as QPUs and vQPUs.

The original circuit goes through runtime prediction to determine or predict the amount of resources needed to perform one or more operations, execution times for each of those operations, and other factors or characteristics. The orchestration engine may also predict (or use a trained machine learning model to predict) the success rate, resource consumption and execution times of cutting operations. The orchestration engine, based on these predictions, real-time telemetry, and service-level objectives, can then determine whether the criteria are met or satisfied. For example, a decision to cut a quantum circuit may be based on the predictions, real-time (or most recent) telemetry data, service-level objectives, and/or other criteria.

Once the orchestration engine determines that a quantum circuit should be cut (e.g., overall performance is improved), the orchestration engine passes the original quantum circuit to a circuit cutting engine and receives the quantum subcircuits if the circuit cutting operation is successful. Each of the quantum subcircuits is then passed to a runtime prediction component or model to obtain or predict the corresponding runtime characteristics. Based on these runtime characteristics and/or service-level objectives such as time, budget, accuracy, number of shots or the like or combinations thereof, the resource optimization engine generates an execution plan. Generating the execution plan may include selecting execution environments (e.g., simulated/real quantum computing systems) for each of the quantum subcircuits. The execution plan from the resource optimization engine is then passed back to the orchestration engine and the orchestration engine orchestrates the execution of the quantum subcircuits or related operations according to the execution plan, which may include sequential and/or parallel circuit execution at one or more quantum computing systems.

FIG. 1 discloses aspects of orchestrating a quantum job. In one example, a quantum job may be generated by a hybrid application. 104 The hybrid application 104 is an application that may require the use of both classical computing resources 120 and quantum computing resources 134. The orchestration of the quantum job may be performed by an orchestration engine and, as previously stated, some aspects of the quantum job may be executed in classical computing systems and other aspects may be executed in quantum environments (simulated or real). When quantum computing resources are required, the hybrid application 104 may generate and submit a quantum job 108 to the orchestration engine 110. Results of executing the quantum job may be returned to the client 102. Other aspects of the hybrid application 104 that do not require quantum computing may be performed in classical computing systems with or without the aid of the orchestration engine.

In FIG. 1, a client 102 (e.g., a computing device that may receive user input) may submit a quantum job 108, which may be associated with service level objectives 106 and a hybrid application 104, to an orchestration engine 110. The orchestration engine 110 is configured to orchestrate the execution of the quantum job 108 in accordance with the service level objectives 106.

The orchestration engine 110 may orchestrate the operations involved in executing the quantum job. The actions or tasks orchestrated by the orchestration engine 110 may include circuit cutting/knitting 122, resource optimization 128, hardware selection 124, runtime prediction 130, transpilation 126 or the like or combination thereof. The orchestration engine 110 may have access to execution resources 140, which may include classical computing resources 120 (e.g., servers, nodes, containers, clusters, virtual machines) that include processors, memory, and the like. The execution resources 140 may also include quantum computing resources 134 (real or simulated).

Orchestrating the execution of the quantum job 108 may include managing the stages of executing the quantum job. In effect, the orchestration engine 110 may guide the quantum job 108 through a quantum pipeline such that the output of each stage is directed to the input of the next stage. Examples of stages or operations that may be performed on a quantum job include cutting, transpilation, knitting, resource optimization, runtime prediction, or the like.

Once the quantum circuit or quantum subcircuits are prepared for execution, these circuits are deployed to or placed in the quantum computing resources 134. The results of executing the quantum circuits in the quantum computing resources 134 may also be collected by the orchestration engine 110 and returned to the client 102.

Figure 2:
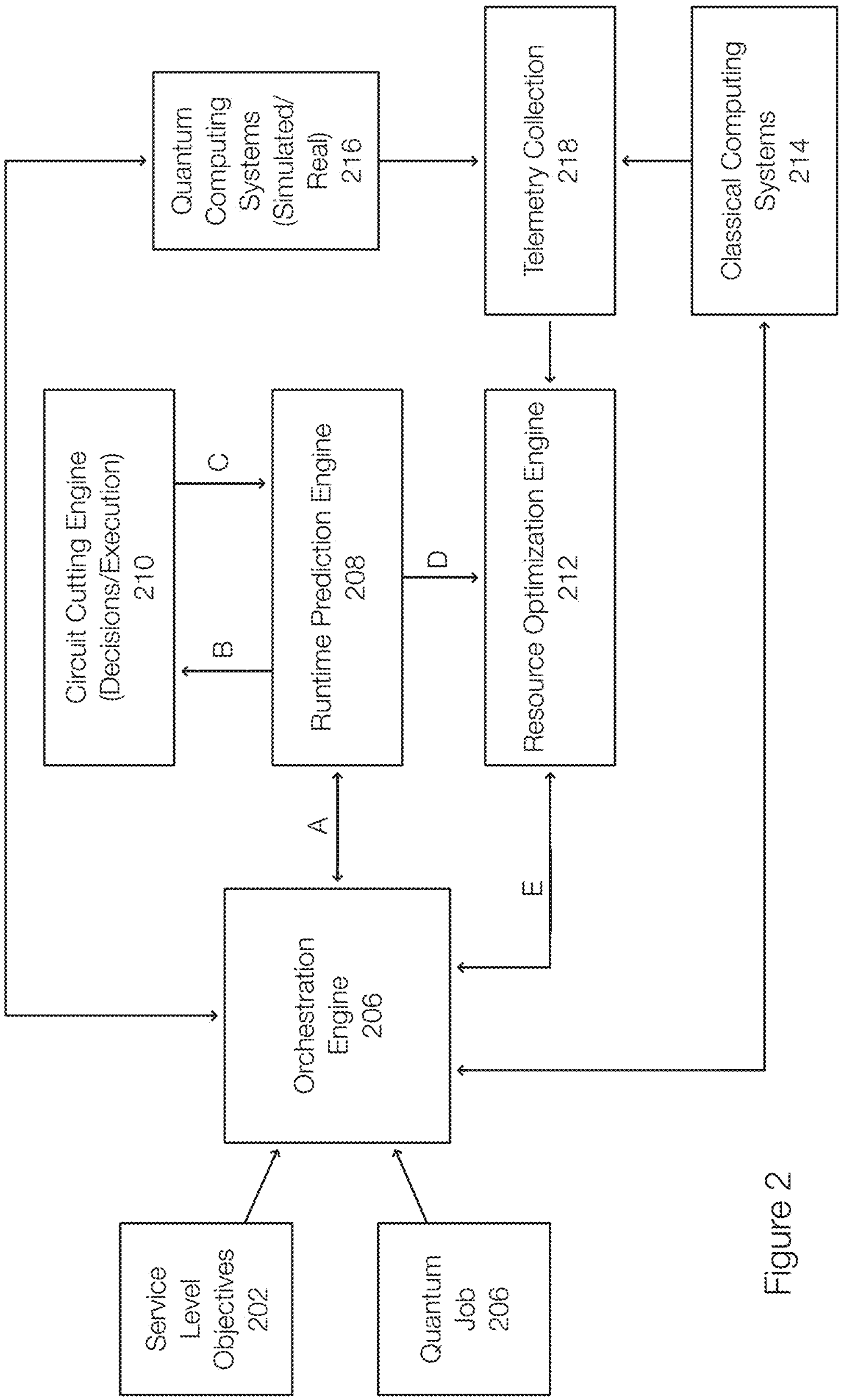
FIG. 2 discloses aspects of executing a quantum job.

FIG. 2 discloses aspects of orchestrating a quantum job. In FIG. 2, an orchestration engine 206 receives a quantum job 206 and associated service level objectives 202. At A, the orchestration engine 206 may submit an original quantum circuit included in the quantum job 206 to a runtime prediction engine 208. The runtime prediction engine 208 may predict or estimate runtime characteristics such as, but not limited to, resources required to execute the original quantum circuit in a simulated quantum system or a real quantum system, time required to execute the original quantum circuit in a simulated or real quantum system, or the like. If feasible, based on the runtime prediction, the original quantum circuit may simply be executed, which may avoid the cost of various operations including cutting operations and knitting operations.

The runtime prediction engine 208 may represent, include, or have access to one or more machine learning models that are configured or trained to estimate various aspects of executing quantum circuits such as resource requirements and execution times. The machine learning model or models included in the runtime prediction engine 208 may be trained using historical executions of quantum jobs in different types of simulated and/or real quantum computing systems. More specifically, the runtime prediction 208 may include models trained to estimate or predict the runtime characteristics of simulated quantum execution operations, real quantum execution operations, cutting operations, or the like.

At B, the original quantum circuit may be evaluated for cutting purposes. The circuit cutting engine 210 may also use the runtime prediction engine 208, which may also be configured to predict a success rate, resource consumption, and execution time related to a cutting operation. This information or estimates may be used in determining whether the quantum circuit should be cut.

Thus, the runtime prediction engine 208 generates output that can be used to determine whether there are enough resources to execute the original quantum circuit within the boundaries of the service level objectives 202. The circuit cutting engine 210 may generate an output that determines whether cutting the original quantum circuit may improve the overall system performance or service-level objectives. The circuit cutting engine 210 may also represent a cutting mechanism configured to cut the original quantum circuit into quantum subcircuits when a decision to cut the original quantum circuit is made.

If the quantum circuit is cut into quantum subcircuits, the runtime prediction engine 208 is used to generate estimated or predicted runtime characteristics for each of the quantum subcircuits.

At D, a resource optimization engine 212 performs resource optimization for either the original quantum circuit or, if the circuit was cut or is planned to be cut, for each of the resulting quantum subcircuits. Optimizing resources may be based, in part, on telemetry collection 218, which includes telemetry information collected from the quantum computing systems 216 and the classical computing systems 214, which are examples of the execution resources 140 used by the orchestration engine 206 when orchestrating the execution of a quantum job. The resource optimization engine 212 uses the collected telemetry data and the predicted runtime characteristics for the quantum circuit or for each of the quantum subcircuits to generate an execution plan at E. The orchestration engine 206 then performs or implements the execution plan that allows resources (e.g., the quantum computing systems 216 and/or classical computing systems 214) to be allocated/used in an intelligent manner that is based on runtime characteristics of the quantum circuit or the quantum subcircuits, current telemetry data and/or service level objectives.

Figure 3:
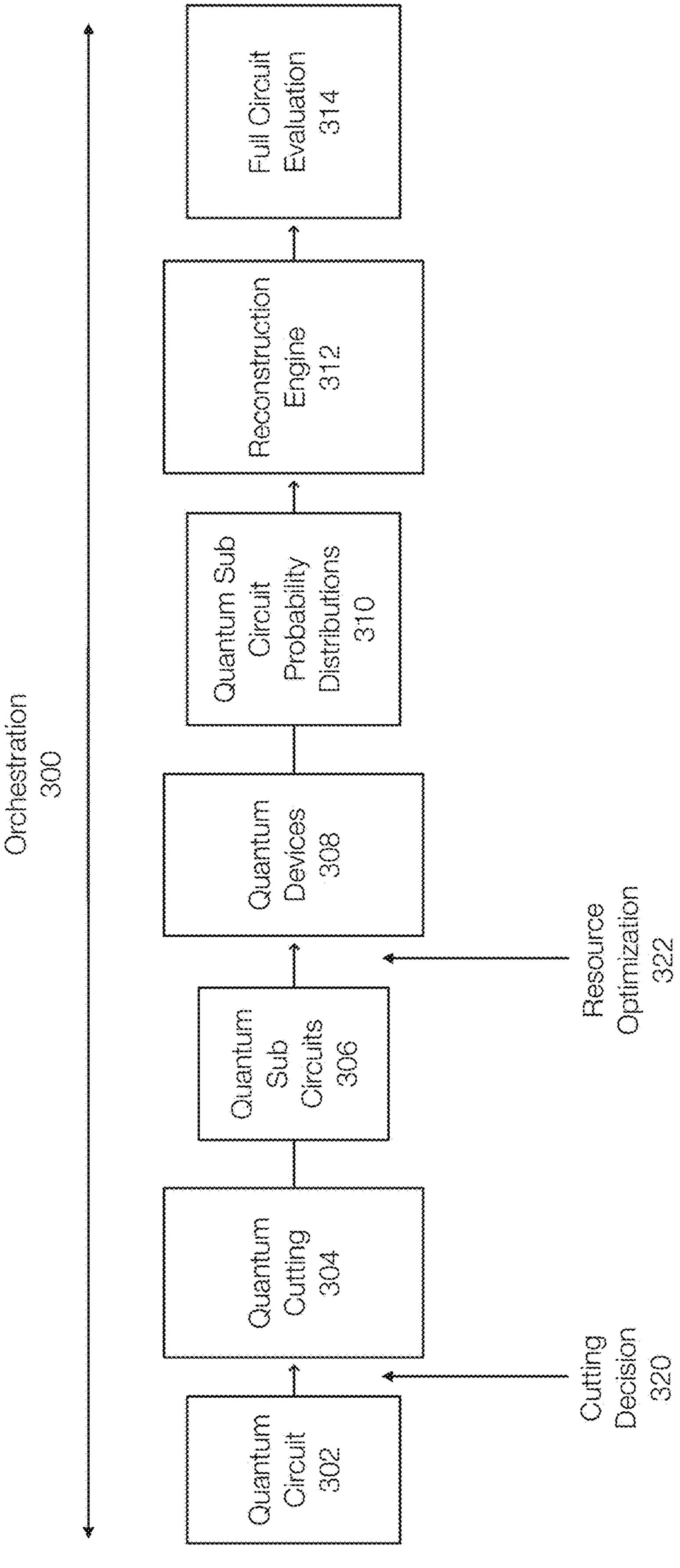
FIG. 3 discloses aspects of cutting a quantum circuit into quantum subcircuits.

FIG. 3 discloses aspects of orchestrating the execution of a quantum circuit and illustrates examples of orchestration actions or operations. In FIG. 3, an orchestration engine performs orchestration 300 that may be performed from receipt of a quantum job or circuit to providing results of executing the quantum circuit. A quantum circuit 302 is provided to quantum cutting 304. While FIG. 3 assumes that the quantum circuit 302 is cut, a cutting decision 320 is performed first to evaluate the criteria and decide whether to cut the quantum circuit 302. The cutting decision 320 may require runtime predictions to be generated with regard to executing the quantum circuit 302 and/or cutting the quantum circuit 320.

Cutting the quantum circuit 302 generates quantum subcircuits 306 that are executed at quantum devices 308 (real or simulated). Once the quantum subcircuits 306 are generated, runtime prediction is performed on the quantum subcircuits 306 such that resource optimization 322 can be performed. Once an execution plan is generated and resources are optimized, the quantum subcircuits 306 are processed as necessary and are submitted to the quantum devices 308 (real and/or simulated) in accordance with the execution plan. The outputs of the executions may include quantum subcircuit probability distributions 310.

Executing a quantum circuit is often performed by executing the circuit in a quantum device for a predetermined number of shots. The output is a collection of shot results which reflect an underlying probability distribution. Thus, the outputs of executing the quantum subcircuits includes the probability distributions 310.

Next, a knitting process is performed by a reconstruction engine 312. The reconstruction engine 312 combines the outputs (e.g., the various probability distributions) of executing the quantum subcircuits 306 to determine the output (the probability distribution) of the original quantum circuit 302. This allows an evaluation 314 of the full or original quantum circuit to be performed. The results or evaluation can be returned to the client or to the hybrid application.

Embodiments of the invention are configured to dynamically perform real-time orchestration actions or operations, such as circuit cutting, based on telemetry from available resources and environments while accounting for the cost of the orchestration operations and/or execution operations. Embodiments of the invention are further configured to generate an execution plan, based on runtime predictions of circuit or subcircuit operations (e.g., transpilation, cutting, knitting, execution), service level objectives, telemetry, and/or other factors.

Figure 4:
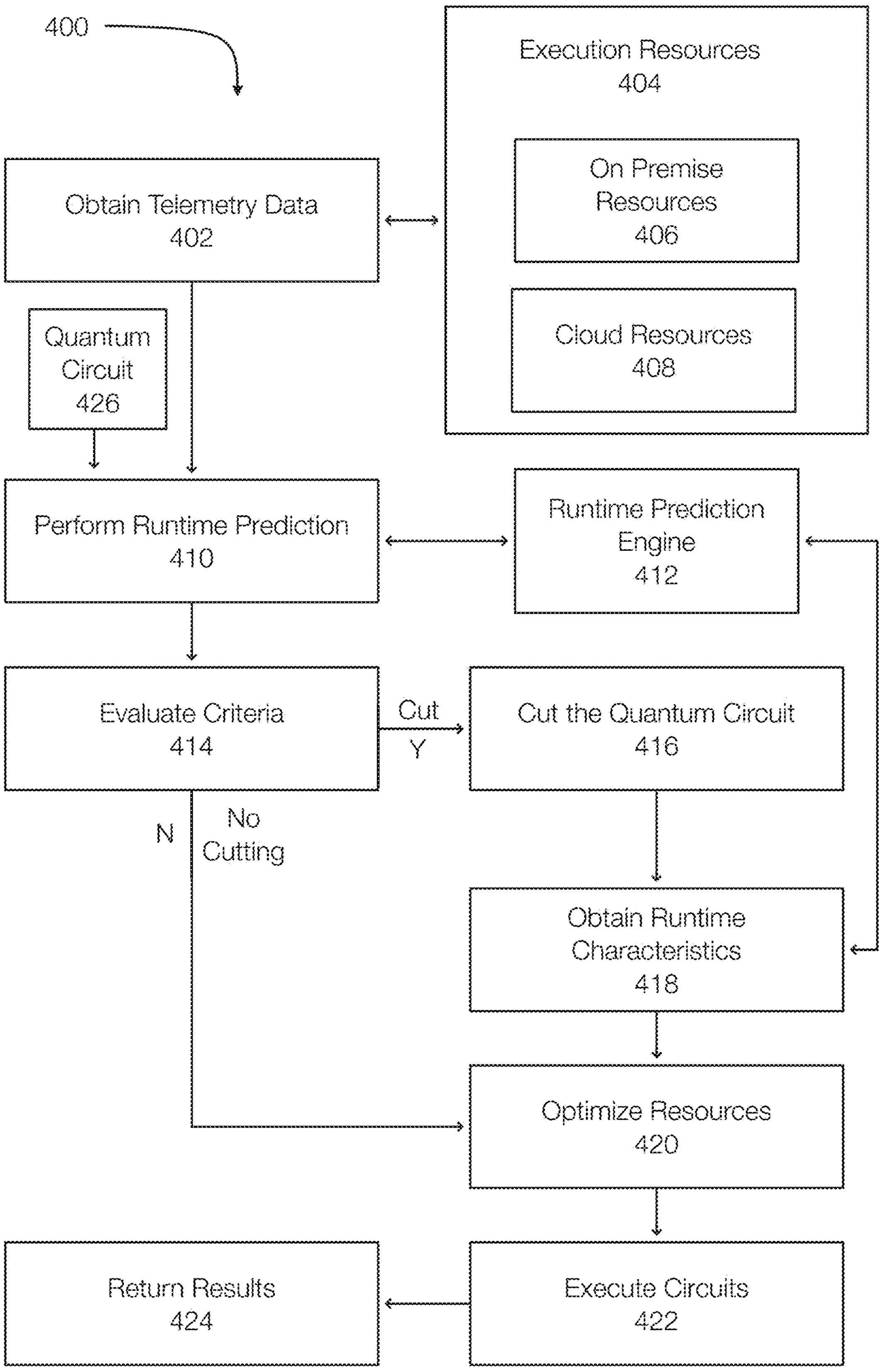
FIG. 4 discloses aspects of intelligently orchestrating the execution of quantum subcircuits.

FIG. 4 discloses aspects of orchestrating the execution of a quantum job. In the method 400, an orchestration engine may obtain 402 telemetry data from execution resources 404, which may include classical computing resources and quantum computing resources and which may be on premise resources 406 and/or cloud resources 408. These resources 404 may be from different providers and may be geographically diverse. Telemetry data is generally collected in an ongoing basis such that, at any given time, current telemetry data is available and can be used in generating execution plans.

The telemetry data may include, by way of example, information about the computing environment such as total resources, type of resources, available resources, accelerators present (e.g., GPU), queued jobs, or the like. The telemetry data may also reflect capabilities or other characteristics of these resources such as manufacturing information, model, or the like. Similar information may be available from the quantum computing resources.

Next, the method 400 may receive a quantum circuit 426. Runtime prediction is performed 410 using the quantum circuit 426 and/or the telemetry data 402. A runtime prediction engine 412, which is an example of a trained machine learning model, may generate inferences, estimates, or predictions using the quantum circuit 426 (or features extracted therefrom) and/or the telemetry data to generate the inferences. In one example, the amount of resources required, the execution time, and other factors may be estimated or predicted. The runtime characteristics generated by the runtime prediction engine may relate to determining whether the quantum can be cut, cutting the quantum circuit, or the like or combinations thereof.

Next, the criteria for cutting the quantum circuit 426 is evaluated 414 in light of the runtime prediction (or runtime characteristics). For example, the runtime prediction may be used to determine whether there are enough resources to execute the original quantum circuit 426 within the boundaries of the associated service level objectives. The runtime prediction may also be used to determine whether cutting the original quantum circuit 426 would improve the performance of the overall system or the service level objectives.

Based on these criteria, a decision is made to cut the circuit (Y at 414) or to not cut the circuit (N at 414). Generally, a decision is made to cut the original quantum circuit when cutting would improve performance of the overall system. Cutting may be performed even if the original quantum circuit can be executed within the requirements of the service level objectives when cutting the quantum circuit improves the overall performance. As previously indicated, the method 400 may simply cut the circuit by default without performing this analysis. In one embodiment, a flag may be set to perform a cutting operation without evaluating the criteria for cutting the quantum circuit 426.

If a decision is made to cut the circuit (Y at 414), the original quantum circuit is cut, by performing a cutting operation, into quantum subcircuits. Runtime characteristics are then generated or obtained 418 for each of the quantum subcircuits. In one example, runtime prediction is performed using the runtime prediction engine 412 for each of the quantum subcircuits.

Based on these runtime characteristics of the quantum subcircuits and the current telemetry data (which may be refreshed or which is continually collected), an execution plan is generated by optimizing 420 the resources to perform or execute the quantum subcircuits or perform other orchestration actions. Optimizing the resources may include selecting specific classical computing systems, specific simulated quantum computing systems, specific real quantum computing systems, or the like based on their telemetry data and/or service level objectives. For example, a first simulated quantum computing system may be selected even if better a second simulated quantum computing system is available when the telemetry data suggests that the second simulated quantum computing system has limited resources actually available.

Thus, the quantum subcircuits are executed 422 in accordance with the execution plan. This may be performed sequentially at the same quantum computing system or in parallel using multiple quantum computing systems, or some combination thereof. The results of these executions are knitted together and returned 424.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, hybrid-classical application operations, quantum circuit operations, quantum circuit execution operations, quantum circuit cutting operations, quantum circuit knitting operations, telemetry operations, machine learning model operations (e.g., that generate predictions or inferences) or the like or combination thereof. These operations may, in some examples, be referred to as quantum operations.

Example cloud computing environments, which may or may not be public, include storage environments that may provide functionality for one or more clients or systems. Another example of a cloud computing environment is one in which quantum operations and/or quantum services may be performed on behalf of one or more clients, applications, or users. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment. The cloud environment may also include quantum environments including vQPUs, QPU, other accelerators, or the like.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data or circuits. Such clients may comprise physical machines, containers, or virtual machines (VMs).

Particularly, devices in the operating environment, such as classical components of hybrid classical-quantum systems, may take the form of software, physical machines, containers, or VMs, or any combination of these, though no particular device implementation or configuration is required for any embodiment. Similarly, data storage system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

It is noted that any operation(s) of any of these methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: obtaining telemetry data from resources available for executing a quantum job, performing a cutting operation to cut a quantum circuit included in the quantum job into quantum subcircuits, performing a runtime prediction for each of the quantum subcircuits to generate runtime characteristics for each of the quantum subcircuits, generating an execution plan by optimizing use of the resources based on the telemetry data and the runtime characteristics, and executing each of the quantum subcircuits according to the execution plan.

Embodiment 2. The method of embodiment 1, further comprising determining whether to proceed with cutting the quantum subcircuits based on criteria associated with executing the quantum circuit and performing the runtime prediction on the quantum circuit to generate corresponding runtime characteristics for the quantum circuit.

Embodiment 3. The method of embodiment 1 and/or 2, wherein the criteria include determining whether sufficient resources to execute the quantum circuit within boundaries of associated service level objectives are available and whether performing the cutting operation improves an overall performance of orchestrating execution of the quantum circuit.

Embodiment 4. The method of embodiment 1, 2, and/or 3, wherein the runtime prediction is configured to predict an amount of resources and an execution time for executing each of the quantum subcircuits.

Embodiment 5. The method of embodiment 1, 2, 3, and/or 4, wherein the runtime prediction is configured to predict a success rate, resource consumption, and execution time associated with the cutting operation.

Embodiment 6. The method of embodiment 1, 2, 3, 4, and/or 5, further comprising deploying the quantum subcircuits to a quantum system for sequential execution of the quantum subcircuits or to multiple quantum systems for at least partially parallel execution of the quantum subcircuits.

Embodiment 7. The method of embodiment 1, 2, 3, 4, 5, and/or 6, further comprising accounting for service level objectives associated with the quantum job.

Embodiment 8. The method of embodiment 1, 2, 3, 4, 5, 6, and/or 7, wherein the service level objectives include time, budget, and/or accuracy.

Embodiment 9. The method of embodiment 1, 2, 3, 4, 5, 6, 7, and/or 8, wherein the resources include classical computing resources, simulated quantum computing resources, and/or quantum computing resources.

Embodiment 10. The method of embodiment 1, 2, 3, 4, 5, 6, 7, 8, and/or 9, further comprising: generating the execution plan based on current telemetry data, the runtime characteristics, and service level objectives associated with the quantum circuit, knitting outputs generated by executing the quantum subcircuits, and providing an output of the quantum circuit to a hybrid application.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-12.

Embodiment 13. A system comprising a processor and memory configured to perform the operations, methods, or processes, or any portion of any of these, or any combination thereof disclosed herein.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, engine, or agent, may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, herein, may take the form of, or include, or be implemented on, or hosted by, a physical computing device, As well, where any of the aforementioned elements comprise or consist of a virtual machine (VM) or a container, that VM or container may constitute a virtualization of any combination of the physical components disclosed herein.

In a physical computing device includes a memory which may include one, some, or all, of random-access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid-state device (SSD) storage. As well, one or more applications may be provided that comprise instructions executable by one or more hardware processors to perform any of the operations, or portions thereof, disclosed herein. The physical device may be an example of a classical computing system that may be part of a hybrid computing system. A quantum processing system or unit may also be included in the hybrid computing system.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

obtaining telemetry data from resources available for executing a quantum job;

performing a cutting operation to cut a quantum circuit included in the quantum job into quantum subcircuits;

performing a runtime prediction for each of the quantum subcircuits to generate runtime characteristics for each of the quantum subcircuits, wherein the runtime prediction is configured to predict an amount of resources and an execution time for executing each of the quantum subcircuits, and wherein the runtime prediction is configured to predict a success rate, resource consumption, and execution time associated with the cutting operation;

generating an execution plan by optimizing use of the resources based on the telemetry data and the runtime characteristics; and executing each of the quantum subcircuits according to the execution plan.

2. The method of claim 1, further comprising determining whether to proceed with cutting the quantum subcircuits based on criteria associated with executing the quantum circuit and performing the runtime prediction on the quantum circuit to generate corresponding runtime characteristics for the quantum circuit.

3. The method of claim 2, wherein the criteria include determining whether sufficient resources to execute the quantum circuit within boundaries of associated service level objectives are available and whether performing the cutting operation improves an overall performance of orchestrating execution of the quantum circuit.

4. The method of claim 1, further comprising deploying the quantum subcircuits to a quantum system for sequential execution of the quantum subcircuits or to multiple quantum systems for at least partially parallel execution of the quantum subcircuits.

5. The method of claim 1, further comprising accounting for service level objectives associated with the quantum job.

6. The method of claim 5, wherein the service level objectives include time, budget, and/or accuracy.

7. The method of claim 1, wherein the resources include classical computing resources, simulated quantum computing resources, and/or quantum computing resources.

8. The method of claim 1, further comprising:

generating the execution plan based on current telemetry data, the runtime characteristics, and service level objectives associated with the quantum circuit;

knitting outputs generated by executing the quantum subcircuits; and providing an output of the quantum circuit to a hybrid application.

9. A non-transitory storage medium having stored therein instructions that are executable by one or more hardware processors to perform operations comprising:

obtaining telemetry data from resources available for executing a quantum job;

performing a cutting operation to cut a quantum circuit included in the quantum job into quantum subcircuits;

performing a runtime prediction for each of the quantum subcircuits to generate runtime characteristics for each of the quantum subcircuits, wherein the runtime prediction is configured to predict an amount of resources and an execution time for executing each of the quantum subcircuits, and wherein the runtime prediction is configured to predict a success rate, resource consumption, and execution time associated with the cutting operation;

generating an execution plan by optimizing use of the resources based on the telemetry data and the runtime characteristics; and executing each of the quantum subcircuits according to the execution plan.

10. The non-transitory storage medium of claim 9, further comprising determining whether to proceed with cutting the quantum subcircuits based on criteria associated with executing the quantum circuit and performing the runtime prediction on the quantum circuit to generate corresponding runtime characteristics for the quantum circuit.

11. The non-transitory storage medium of claim 10, wherein the criteria include determining whether sufficient resources to execute the quantum circuit within boundaries of associated service level objectives are available and whether performing the cutting operation improves an overall performance of orchestrating execution of the quantum circuit.

12. The non-transitory storage medium of claim 9, further comprising deploying the quantum subcircuits to a quantum system for sequential execution of the quantum subcircuits or to multiple quantum systems for at least partially parallel execution of the quantum subcircuits.

13. The non-transitory storage medium of claim 9, further comprising accounting for service level objectives associated with the quantum job.

14. The non-transitory storage medium of claim 13, wherein the service level objectives include time, budget, and/or accuracy.

15. The non-transitory storage medium of claim 9, wherein the resources include classical computing resources, simulated quantum computing resources, and/or quantum computing resources.

16. The non-transitory storage medium of claim 9, further comprising:

generating the execution plan based on current telemetry data, the runtime characteristics, and service level objectives associated with the quantum circuit;

knitting outputs generated by executing the quantum subcircuits; and providing an output of the quantum circuit to a hybrid application.

17. A method comprising:

obtaining telemetry data from resources available for executing a quantum job;

performing a runtime prediction for a quantum circuit included in the quantum job to generate first runtime characteristics for the quantum circuit;

determining, based on the telemetry data, the first runtime characteristics, and one or more service level objectives, whether to perform a cutting operation on the quantum circuit, wherein the determining includes evaluating whether performing the cutting operation is predicted to improve execution of the quantum circuit;

performing a cutting operation to cut the quantum circuit included in the quantum job into quantum subcircuits in response to determining to perform the cutting operation;

performing a runtime prediction for each of the quantum subcircuits to generate runtime characteristics for each of the quantum subcircuits, wherein the runtime prediction is further configured to predict at least a success rate, resource consumption, and execution time associated with performing the cutting operation;

generating an execution plan by optimizing use of the resources based on the telemetry data and the runtime characteristics and the one or more service level objectives; and executing each of the quantum subcircuits according to the execution plan.

* * * * *